US010317234B2

(12) United States Patent
Kang et al.

(10) Patent No.: US 10,317,234 B2
(45) Date of Patent: Jun. 11, 2019

(54) TERMINAL FOR PROVIDING VEHICLE INTERFACE AND CONTROL METHOD THEREOF

(71) Applicant: INFOBANK CORP., Seongnam-si, Gyeonggi-do (KR)

(72) Inventors: Hong Suk Kang, Yongin (KR); Ji Hoon Ah, Seoul (KR); Jong Cheol Hong, Seoul (KR)

(73) Assignee: INFOBANK CORP., Seongnam-si (KR)

( * ) Notice: Subject to any disclaimer, the term of this patent is extended or adjusted under 35 U.S.C. 154(b) by 224 days.

(21) Appl. No.: 15/245,846

(22) Filed: Aug. 24, 2016

(65) Prior Publication Data

US 2017/0060351 A1    Mar. 2, 2017

(30) Foreign Application Priority Data

Aug. 25, 2015  (KR) .................. 10-2015-0119855
Aug. 25, 2015  (KR) .................. 10-2015-0119856

(51) Int. Cl.
| | |
|---|---|
| *G06F 3/14* | (2006.01) |
| *G01C 21/36* | (2006.01) |
| *H04W 4/16* | (2009.01) |
| *H04W 4/14* | (2009.01) |

(52) U.S. Cl.
CPC ..... *G01C 21/3626* (2013.01); *G01C 21/3688* (2013.01); *G01C 21/3697* (2013.01); *H04W 4/14* (2013.01); *H04W 4/16* (2013.01)

(58) Field of Classification Search
CPC .................... G06F 3/14; G06F 3/17

USPC .............. 715/708; 701/22, 36, 414, 423
See application file for complete search history.

(56) References Cited

U.S. PATENT DOCUMENTS

| | | | | |
|---|---|---|---|---|
| 2005/0027447 A1* | 2/2005 | Hirose | ............... | G01C 21/3492 701/423 |
| 2010/0057358 A1* | 3/2010 | Winer | ................ | G01C 21/3407 701/414 |
| 2010/0228415 A1* | 9/2010 | Paul | ........................ | B60L 8/003 701/22 |

(Continued)

FOREIGN PATENT DOCUMENTS

| | | |
|---|---|---|
| JP | H10294965 A | 11/1998 |
| JP | H10304464 A | 11/1998 |

(Continued)

*Primary Examiner* — Ruay Ho
(74) *Attorney, Agent, or Firm* — Novick, Kim & Lee, PLLC; Sang Ho Lee

(57) ABSTRACT

Disclosed herein is a terminal for providing a vehicle interface to a vehicle information terminal, which may include a terminal information collection unit configured to collect a terminal information of other terminals which is able to receive and transmit a content data; a wireless communication unit configured to receive a content data reproduction request from the other terminal; a content interface generation unit configured to generate a content interface which provides through the vehicle interface based on the terminal information and the content data reproduction request; and a content data relay unit configured to control reproducing the content data received from the other terminal through the content interface and providing to the vehicle information terminal.

16 Claims, 9 Drawing Sheets

(56) References Cited

U.S. PATENT DOCUMENTS

2015/0142261 A1\* 5/2015 Wright, Jr. ............. B60K 35/00
701/36

FOREIGN PATENT DOCUMENTS

| JP | 2003-125454 A | 4/2003 |
|----|---------------|--------|
| JP | 2007-085986 A | 4/2007 |
| JP | 2009-188725 A | 8/2009 |
| JP | 2010-203928 A | 9/2010 |
| JP | 5592473 B2 | 9/2014 |
| KR | 10-2013-0064272 A | 6/2013 |
| KR | 10-1311503 B1 | 9/2013 |

\* cited by examiner

TERMINAL FOR PROVIDING VEHICLE INTERFACE AND CONTROL METHOD THEREOF

BACKGROUND

CROSS REFERENCE TO RELATED APPLICATIONS

The present invention claims benefit of priority to Korean patent application Nos. 10-2015-0119855 and 10-2015-0119856, both filed in KIPO on Aug. 25, 2015, and the entire contents of these priority applications are hereby incorporated by reference.

TECHNICAL FIELD

The present invention relates to a terminal for providing a vehicle interface and a control method thereof.

BACKGROUND ART

The terminal may be categorized based on its mobility into a mobile/portable terminal and a stationary terminal. The mobile terminal may be categorized based on a user's direct portability into a handheld terminal and a vehicle-mounted terminal.

The aforementioned terminal may be implemented in the form of a multimedia player equipped with a combined function, for example, a photographing, a video recording, a playback of a music or a video, a game, a broadcasting reception, a navigation, etc.

For the sake of a terminal's function support and improvement, a terminal structure or software may be improved.

As the supply of a smartphone increases in recent years, a technology for providing a vehicle interface using the aforementioned terminal is being developed, which is able to substitute a typical AVN (Audio Video Navigation System) provided at a vehicle.

The navigation system provided through a vehicle interface can be supplied on a display unit of a terminal or a display unit installed at a vehicle. This is a system obtained by specifically embodying an ITS (Intelligent Transport System). Such a system my include a system which is able to provide a surrounding road traffic state based on the position of the current vehicle in such a way to provide a vehicle with a position information obtained using a GPS (Global Positioning System) satellite and which is also able to detect the position information of a vehicle using a GPS information received from the GPS satellite and to provide a vehicle driver with a map information corresponding to the position information and with a route information to a destination based on the detected position information of the vehicle.

The aforementioned terminal is commonly equipped with the above various functions, so other unnecessary functions may be concurrently carried out. Hence, if the execution of other function is requested to a terminal while such vehicle interface functions are being provided, a corresponding vehicle interface function is temporarily interrupted, and the execution-requested other function should be frequently carried out.

For example, if a telephone reception is requested at the moment a route guide announcement of a vehicle navigation function is outputted, the conventional terminal does not normally output the aforementioned route guide announcement, and instead a telephone reception tone is outputted or a telephone reception screen appears, for which a vehicle driver fails to receive a route information, thus abnormally deviating from a guided route.

Moreover, if a vehicle driver is a beginner, the driver may lose a driving concentration since he may be embarrassed by an unexpected output of a telephone reception tone or telephone reception screen display, for which a collision accident with surrounding other vehicles may occur a lot.

SUMMARY OF THE DISCLOSURE

Technical Problem

Accordingly, the present invention is made in an effort to resolve the aforementioned problems. It is an object of the present invention to provide a terminal for providing a vehicle interface and a control method thereof, wherein if an important event related with a vehicle interface occurs in the middle of providing another vehicle interface, such an invent may be deferred for a predetermined time in such a way to delay an execution request of other function, and a user's convenience can be enhanced by providing an additional function based on the delay of execution.

Technical Solution

To achieve the above objects, there is provided a method for controlling a terminal which provides a vehicle interface, which may include, but is not limited to, providing a first function related with the vehicle interface; delaying the execution of the second function under a predetermined condition, if an execution of the second function which is different from the first function of the terminal is requested; executing a predetermined additional function to compensate for the delay of the second function, if the execution of the second function has been delayed; and resuming the second function based on the operation of the additional function, if the execution delay of the second function is ended.

To achieve the above objects, there is provided a terminal for providing a vehicle interface, which may include, but is not limited to, a vehicle interface generation unit configured to generate a vehicle interface which provides, through a GUI (Graphic User Interface), an information related with a vehicle; a control unit configured to provide a first function through the vehicle interface; an execution delay unit configured to delay the execution of the second function under a predetermined condition, if the execution of the second function which is different from a first function of the terminal, is requested; and an additional function processing unit configured to execute an additional function to compensate for the delay of the second function, if the execution of the second function is delayed, wherein if the execution delay of the second function is ended, the control unit resumes the second function based on the operation of the additional function.

To achieve the above objects, the method according to an embodiment of the present invention may be implemented with a program recorded on a medium to execute it on a computer and a recording medium thereof.

ADVANTAGEOUS EFFECTS

According to an embodiment of the present invention, the present invention is provided to resolve the aforementioned problems. If an important event corresponding to a first function during the provision of the first function related with a vehicle interface, and an execution of a second function different from the first function of the terminal during the time corresponding to the important event is requested, an execution request of other function is delayed during the occurrence of an important event related with the vehicle interface during the provision of a vehicle interface of the execution delay to delay the execution of the second function, thus deferring such an execution for a predetermined time, and an additional function can be provided after the delay of the execution, by which a user's convenience can be enhanced.

In this way, a driver's safety can be protected, and a necessary information can be normally received without interfering with a vehicle interface in case where the reception of a route guide is not available or in case of an emergency situation. Moreover, the operation of an abrupt telephone reception tone output and a telephone reception screen display can be interrupted in advance, thus enhancing a driver's concentration, by which any potential collision accident with other surrounding vehicles can be prevented.

Moreover, a predetermined compensation can be processed with respect to an execution delay in such a way to provide an additional function for the execution delay, by which any inconvenience due to an execution delay can be reduced, and a user's convenience can be promoted.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION

Figure 1:
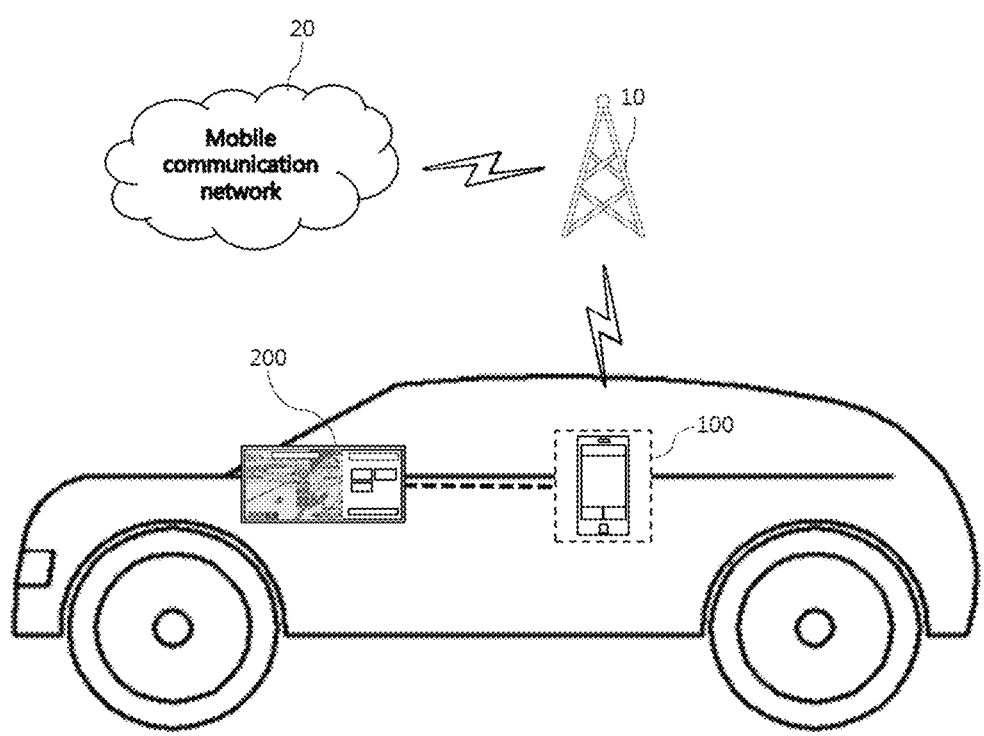
FIG. 1 is a schematic view illustrating the entire system according to an embodiment of the present invention.

The following descriptions provides the principle of the present invention. A person having ordinary skill in the art is able to invent a variety of devices included in the concept and scope of the present invention while implementing the principle of the present invention although such a principle is not clearly described or illustrated in the present specification. Moreover, all the conditional terms and embodiments listed in the present specification are intended to achieve a purpose for the concept of the present invention to be understood and should be interpreted not to be limited to the listed embodiments and states.

Moreover, all the detailed descriptions describing the principle, viewpoint and embodiments as well as specific embodiments of the present invention should be understood as intending to include the structural and functional equivalents of this matters and all the components invented to perform the same functions irrespective of the equivalents, namely, structures which could be developed later.

For example, the block diagram of the present specification should be understood as indicating the conceptual viewpoint of an exemplary circuit which embodies the principle of the present invention. Similarly, all the flow charts, state conversion diagrams, pseudo codes, etc. may be actually expressed in the form of a computer readable medium and should be understood as indicating various processes which can be executed by a computer or a processor without considering if the computer or processor has been illustrated clear.

The functions of various components illustrated in the drawings including the processors and the functional blocks illustrated in the forms of similar concepts may be provided based on the use of the exclusive hardware as well as the hardware having an ability to execute the software in relation with an appropriate software. If the function is provided based on the processor, such a function may be implemented with a single exclusive processor, a single shared processor or a plurality of individual processors, wherein a part thereof may be shared.

Moreover, the clarified use of the terms employed in relation with a processor, a control thereof or a concept similar with the same should not be interpreted in such a way to exclusively cite the hardware having an ability to execute the software, and but should be understood as implicitly including a ROM, a RAM and a nonvolatile memory which is able to store the software, and another known memory may be included.

In the claim of the present specification, the components expressed in the form of means to perform the functions recited in the detailed descriptions is intended to include all ways to perform the functions including all types of the software including a combination of circuits designed to perform, for example, the aforementioned functions or a firmware/micro code, etc., and may be combined with an appropriate circuit to execute the above software. In the present invention, since the functions provided by the above listed means may be combined, and the claims may be combined in required ways, it should be understood that any means providing the aforementioned function can be equivalent to that which could be recognizable from the present specification.

The aforementioned purpose, feature and advantage would become apparent by way of the following detailed description related with the accompanying drawings, and a person having ordinary skill in the art could easily perform the technical concepts of the present invention. Moreover, when describing the present invention, if it is determined that the detailed description on the known technology related with the present invention could make unclear the subject matters of the present invention, the detailed descriptions thereof may be omitted.

Various embodiments of the present invention will be described with reference to the accompanying drawings.

The terminal 100 may constitute an integrated system in such a way to provide a variety of information which could support, supplement and increase the functions of vehicle navigations in cooperation with the vehicle display device 200. In the entire systems, the terminal 100 may be implemented with a variety of devices which could be provided to or engaged to the vehicle. For example, the terminal 100 may be implemented with a typical vehicle information providing terminal (for example, an ANA system (Audio Video Navigation System) implemented in the form of one system wherein an audio and multimedia device, a navigation device, etc. are integrated) mounted inside of a vehicle. Moreover, the terminal 100 may be implemented with a variety of devices, for example, an AVN system as well as a navigation which is able to guide a route to a predetermined destination, a black box, a smartphone, a tablet computer, a palm computer, a PDA (Personal Digital Assistant), a PMP (Portable Multimedia Player), etc. which are able to store or transmit a video information by recording the surroundings near a vehicle or it may be implemented in the form wherein it is connected to a mobile communication network.

If the terminal 100 is a navigation or system for a vehicle, the terminal 100 may include a system which is able to inform a driver or passenger of various data related with the operation, maintenance, etc. of the vehicle. In this case, the terminal 100 may be a vehicle navigation itself in terms of its narrow meaning, and it may be various electronic devices which are cooperatively connected in a wired or wireless way in terms of its wide meaning.

Moreover, the vehicle display device 200 may be included in the terminal 100 so as to provide a vehicle interface or may be implemented with a variety of display devices which are provided at or engaged to the vehicle in a wired or wireless way. For example, the vehicle display device 200 may be implemented with a variety of devices such as a display device of a navigation to guide a route to a predetermined destination, a display device of a black box to take a photo of the surrounding of a vehicle and store or transmit an image information, and a display device of a vehicle infotainment system.

Moreover, the vehicle display device 200 according to an embodiment of the present invention may be implemented in the form wherein it is integrated with the terminal 100 or it shares a part of function with the terminal 100. Furthermore, it may be implemented in the form wherein the terminal 100 is held at the vehicle and may use a display function itself which is able to substitute the vehicle display device 200.

If the terminal 100 is equipped with a vehicle interface related with the vehicle display device 200, it will be described that the first function is executed so as to provide a vehicle interface, and if a function different from the first function of the terminal 100 operates, it will be described that the second function is executed. For example, in case of the first function, the navigation function by the vehicle interface function may be referred. In case of the second function, a communication relay function of a Bluetooth, etc. received via the terminal 100 may be referred.

Meanwhile, the terminal 100 and the vehicle display device 200 according to an embodiment of the present invention which are able to perform the above operations may be implemented, for example, with a vehicle navigation, a vehicle box or an augmented reality system.

If the vehicle display device 200 is a vehicle navigation or an augmented reality system, the vehicle display device 200 may be a system which is able to supply various data related with the operation, maintenance, etc. of the vehicle to the driver and passenger of the vehicle. In this case, the vehicle display device 200 may be a vehicle navigation itself or may be a variety of display devices which cooperatively operate in a wired or wireless way with the terminal 100 which provides the vehicle interface.

The terminal 100 according to an embodiment of the present invention may be equipped with a communication function or a communication relay function as well as a basic mode function. In the basic mode function, a first interface can be outputted, which is able to control the basic function of the terminal 100. In the basic mode, the terminal 100 may perform the functions provided to the user. For example, the basic function may include a vehicle information providing function, a communication function, a communication relay function, a texting function, an internet function, a memo function, an alarm function, and a scheduling function.

Moreover, the terminal 100 according to an embodiment of the present invention may be switched to a vehicle interface mode which is able to provide a vehicle interface like a navigation based on a connection to a user's input or a vehicle display device 200. In this case, the terminal 100 can generate and display a vehicle interface or can output the vehicle interface via the vehicle display device 200. In case of an operation based on the connection to the vehicle display device 200, it can output a vehicle interface to the vehicle display device 200 and can be switched to a vehicle interface mode which controls the vehicle interface. In this way, in the vehicle interface mode, the terminal 100 is able to provide a vehicle interface which is different from the first interface.

In the vehicle interface mode of the terminal 100, the aforementioned basic functions can be executed and provided together. For example, while the terminal 100 is providing the vehicle interface, the terminal 100 is able to provide together a communication function or a communication relay function, a texting function, an interface function, a memo function, an alarm function, a scheduling function, etc.

Moreover, the vehicle display device 200 may be connected with the terminal 100 in a wired or wireless way and may be provided inside of the vehicle. A user is able to control the terminal 100 via the vehicle display device 200 and is able to control the vehicle display device 200 through the terminal 100.

The entire system network formed of the terminal 100 and the vehicle display device 200 according to an embodiment of the present invention may be connected through a wired or wireless network. In case of the wired connection, it may be connected to the network via a HDMI interface, a VGA interface, a sRGB interface, a USB interface or other cable interface, and in case of the wireless connection, it may be connected to the network via a Bluetooth, a RFID (Radio Frequency Identification), an IrDA (Infrared Data Association), a UWB (Ultra WideBand), a ZigBee, etc. Moreover, in case of the terminal 100, the operation of the basic function can be processed in such a way to receive a call signal via the base station 10 and a mobile communication network 20.

Furthermore, if an important event corresponding to the first function occurs while the first function related with the vehicle interface is being supplied through the vehicle interface, the terminal 100 providing the vehicle interface may delay the execution of the second function during a time period corresponding to the important event in case where the execution of the second function different from the first function of the terminal is requested.

Moreover, if the execution of the second function is delayed, the terminal 100 may execute an additional function to compensate for the delay of the second function, and if the execution delay of the second function is over, the second function may be resumed based on the operation of the additional function.

The operation of each component with respect to the operation of the terminal 100 will be described below.

Figure 2:
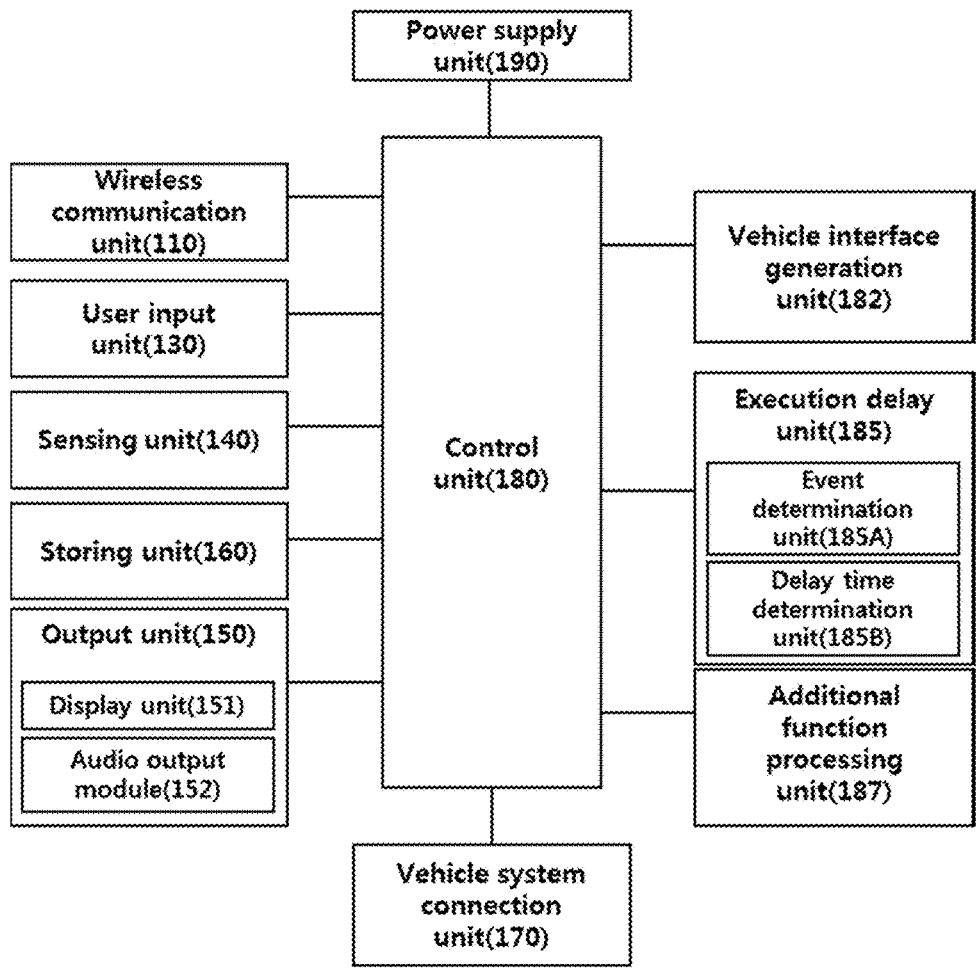
FIG. 2 is a block diagram illustrating a specific configuration of a terminal according to an embodiment of the present invention.

FIG. 2 is a block diagram illustrating a detailed configuration of the terminal according to an embodiment of the present invention.

Referring to FIG. 2, the terminal 100 according to an embodiment of the present invention may include a wireless communication unit 110, a user input unit 130, a sensor unit 140, an output unit 150, a storing unit 160, a vehicle connection unit 170, a control unit 180 and a power supply unit 190. A vehicle interface generation unit 182 and an execution delay unit 185 may be connected to the control unit 180. The components in FIG. 2 are not essential components, for which the terminal 100 formed of more or less than such components.

The wireless communication unit 110 may include one or more than one module which may allow a wireless communication between the terminal 100 and the wireless communication system or between the terminal 100 and a network where the vehicle display device 200 positions. For example, the wireless communication unit 110 may include a broadcast reception module, a mobile communication module, a wireless internet module, a short range communication module and a position information module.

The broadcast reception module is able to receive the information related with a broadcast signal and/or broadcast from an external broadcast management server through a broadcast channel and store in the storing unit 160 the information related with the broadcast signal and/or broadcast received via the broadcast reception module.

The module communication module is configured to transmit or receive a wireless signal to/from any of a base station, an external terminal and a server through the mobile communication network. The wireless signal may include various type data for the sake of transmission and reception of a voice call signal, a video communication call signal or a text/multimedia message.

The wireless internet module is referred to a module which may be used for a wireless internet connection and may be installed internal or external to the terminal 100. The wireless internet technology may be implemented with any of a WLAN (Wireless LAN) (Wi-Fi), a Wibro (Wireless broadband), a Wimax (World Interoperability for Microwave Access), a HSDPA (High Speed Downlink Packet Access), etc.

The short range communication module is referred to a module which may be employed for a short range communication. The short range communication technology may be any of a Bluetooth, a RFID (Radio Frequency Identification), an IrDA (Infrared Data Association), a UWB (Ultra Wideband), a ZigBee, etc. If the terminal 100 is formed of an AVN system, it may be configured to perform a relay function of a voice communication in response to a voice signal received from other terminal via the short range communication module.

The position information module may be referred to a module which is able to obtain the position of a corresponding terminal. As an exemplary example thereof, there is a GPS (Global Positioning System) module.

The user input unit 130 may generate an input data for a user to control the operation of a terminal. The user input unit 130 may be formed of a key pad dome switch, a touch pad (a constant pressure/electrostatic type), a jog wheel, a jog wheel, etc. Moreover, a camera or a receiver may be connected to the user input unit 130. The user input unit 130 may be configured to detect a gesture input in a video data from the camera or obtain an input data in a voice information inputted via the receiver.

The sensor unit 140 is configured to detect the opened and closed states of the terminal 100, the position of the terminal 100, a user's contact state, the direction of the terminal, and the acceleration and deceleration of the terminal. Moreover, the sensor unit 140 is able to sense an electric power supply state of the power supply unit 190 and an engaged state of an external input device of the vehicle system connection unit 170.

The sensor unit 140 may include, for example, an altitude sensor, an acceleration sensor, a terrestrial magnetism sensor, a gyro sensor, an atmospheric sensor, etc. The altitude sensor is able to sense the altitude of the terminal 100, and the acceleration sensor is able to sense a 3-axis acceleration change of the terminal 100. Moreover, the terrestrial magnetism sensor is able to sense any change in a magnetic field at the surrounding thereof. The gyro sensor is able to sense any motion due to a change in the gravity which is applied to the terminal 100.

The output unit 150 is able to generate an output related with a light sense, a hearing sense, a haptic sense, etc. and may be formed of a display unit 151 and an audio output module 152.

The display unit 151 is able to display (output) an information which is processed by the terminal 100. For example, if the terminal is in the basic mode, it may display a UI (User Interface) or a GUI (Graphic User Interface) related with the communication among the basic functions. Moreover, if the terminal 100 is in the vertical interface mode which provides a vehicle interface, the UI or GUI related with the vehicle interface may be displayed.

The display unit 151 may include at least one among a LCD (Liquid Crystal Display), a TFT LCD (This Film Transistor Liquid Crystal Display), an OLED (Organic Light Emitting Diode), a flexible display, and a 3D display.

The audio output module 152 is configured to output an audio data received from the wireless communication 110 or stored in the storing unit 160 in any of a call signal reception mode, a communication mode or a recording mode, a voice recognition mode and a broadcast mode. The audio output mode 152 may output an audio signal related with the function (for example, a call signal reception tone, a message reception tone, etc.) carried out by the terminal 100. This audio output module 152 may be formed of a receiver, a speaker, a buzzer, etc.

Moreover, the output unit 150 is configured to output, in the form of an image, a vibration or a sound, the signal corresponding to an event occurrence of the terminal 100 in such a way to use the aforementioned components.

As an example of the events which occurs at the terminal, there are a call signal reception, a message reception, a key signal input, a touch input, etc. which correspond to the basic functions. There may be an important event corresponding to the function related with the vehicle interface mode.

In particular, in case of the important event, there may be a cross entering event, a vehicle's quick turning event, a guide announcement output event, etc. which are related with the vehicle navigation functions. If other event occurrence is requested at an occurrence time of the important event, the output unit 150 may perform an operation which may be carried out after a predetermined delay time in accordance with a priority order and a state information in response to a control of the control unit 180 which will be described later.

The storing unit 160 may store the program used for the operation of the control unit 180 or may temporarily store the inputted and outputted data. The storing unit 160 may store the data for the provision of the vehicle interface or may store an important event information, a state information, etc. related with the vehicle interface.

The storing unit 160 may include at least one type among a flash memory type, a hard disk type, a multimedia card micro type, a card type storing unit (for example, a SD or XD storing unit, etc.), a RAM (Random Access Memory), a SRAM (Static Random Access Memory), a ROM (Read Only Memory), an EEPROM (Electrically Erasable Programmable Read-Only Memory), a PROM (Programmable Read Only Memory), a magnetic storing unit, a magnetic disk and an optical disk.

The vehicle system connection unit 170 may operate as a passage to an external device connected to the terminal 100. The vehicle system connection unit 170 may be configured to receive a data from the external device, transfer the received electric power to each component of the inside of the terminal 100 and transmit the data inside of the terminal 100 to the external device. For example, the vehicle system connection unit 170 may include a wired or wireless headset port, an external charger port, a wired or wireless data port, a storing unit card (a memory card) port, a port to connect a device equipped with an identification module, an audio I/O (Input/Output) port, a video I/O (Input/Output) port, an earphone port, etc. For example, the vehicle display device 200 may be connected in a wired way to the terminal 100 via the vehicle system connection unit 170. The vehicle display device 200, however, may be connected via a network to the terminal 100 through the wireless communication unit 110.

The control unit 180 is able to perform an operation in such a way to control the whole typical operations of the terminal, generate a vehicle interface, display the generated vehicle interface on the display unit 151 or provide to the vehicle display device 200.

For this, the vehicle interface generation unit 182 may perform a generation and control operation of the vehicle interface in accordance with a control of the control unit 180. Moreover, the control unit 180 may generate a control signal used for the sake of a vehicle interface control which is generated by the vehicle interface generation unit 182 in response to a user's input with respect to the user input unit 130.

According to an embodiment of the present invention, the control unit 180 may be configured to execute the first function related with the vehicle interface in response to the operation of the vehicle interface generated by the vehicle interface generation unit. Here, the first function may include various functions which provide the information related with the vehicle via the vehicle interface. For example, the first function may include a navigation function which is used to perform a road guidance to a predetermined destination of the vehicle.

Moreover, the control unit 180 may determine if the execution of the second function different from the first function has been requested through the execution delay unit 185 while the first function is being provided. The second function may correspond to the basic function as described in connection with the terminal 100. For example, the second function may include at least one among a communication function or communication relay function, a texting function, an internet function, a memo function, an alarm function and a scheduling function which are different from the first function.

The execution delay unit 185 may be configured to determine using an event determination unit 185a if an important event has occurred. The important event may correspond a state information determined in response to at least one among a processing information processed by the control unit 180, a vehicle interface control information and a sensing information sensed by the sensing unit 140.

For example, the event determination unit 185a may determine an occurrence state of the important event in such a way to detect a process being underway by the control unit 180 and determine if there is a process corresponding to the important event among the aforementioned processes. The process corresponding to the important event may be a navigation process, and if there exists a navigation process, the event determination unit 185a is able to confirm an attribute value of the navigation process to determine the occurrence state of the important event. Moreover, if a predetermined value corresponding to the important event is detected from the attribute value of the navigation process, the event determination unit 185a may determine it as an occasion wherein the important event has occurred.

Moreover, the event determination unit 185a may determine an important event occurrence based on the vehicle interface control information processed by the control unit 180. The control unit 180 may manage a state information of the vehicle interface, and the state information of the vehicle interface may correspond to each important event. For example, if at least one among an occurrence of a guide announcement output event, an occurrence of a quick turn event and a cross entering event is detected in accordance with a state information of the vehicle interface, the event determination unit 185a may determine it as an occasion wherein the important event has occurred.

Meanwhile, the event determination unit 185a may determine an important event occurrence based on an acceleration information processed by the sensing unit 140. If an acceleration information of a predetermined axis processed by the sensing unit 140 is over a threshold value, the event determination unit 185a may determine that the important event has occurred.

Moreover, the delay time determined unit 185b may determine a delay time during which the execution of the second function can be delayed in response to the determined important event.

For this, the storing unit 160 may previously store an important event, a state information and a mapping table wherein the delay time is mapped.

More specifically, the important event may be obtained based on a state information of the route provision like the navigation. The state information may include at least one among a route deviation information, a high speed information and a cross approaching information, and the execution delay unit 185 may process an execution delay in accordance with the time period based on each state information.

Moreover, the delay time determination unit 185b may determine, using the mapping table, a delay time during which the execution of the second function is delayed, based on the kinds and circumference of the important event, and the delay time may set by the unit of seconds or milliseconds.

In addition, the delay time may be allocated to the delay time. For example, the delay time determination unit 185b may allocate a predetermined delay condition to the delay time. More specifically, the delay condition may include an interrupt occurrence, etc. based on the removal of the important event or the user's input. The delay time determination unit 185*b* may actively determine the duration and condition of a delay time.

Based on the thusly set delay time, the execution delay unit 185 may delay an operation time of the execution thereof based on the delay time and condition of the second function even if there is an execution request of the second function. Here, the delay may represent any of an execution stop of a program executed by the control unit 180, a pause, a rejection of a program execution request, a postpone of a program execution request and a control of an execution time. The control unit 180 may resume or awake the execution of the second function if the aforementioned time has passed or the delay condition has been removed.

Moreover, if the important event has occurred in a state where the first function and the second function are being concurrently supplied in accordance with the request of the execution delay unit 185, the control unit 180 may stop the operation of the second function, and the meaning of the delay may include such a process.

The operation of the control unit 180 according to the present invention may be described based on the following embodiments.

As the first function, the navigation function is provided, and if the important event includes a guide announcement output event of the navigation function operation, the time period corresponding to the important event may correspond to the guide announcement output time.

If the execution of another second function (for example, a communication function or a communication relay function, a texting function, a scheduling function, an alarm function, etc.) is requested at the time the guide announcement is outputted while the navigation function is being provided via the vehicle interface, the control unit 180 may delay the operation of the second function until the time the guide announcement output is completed.

As the first function, the navigation function is provided, and if the important event includes a route deviation event of the navigation function operation, the time period corresponding to the important event may include a time which has passed a predetermined time from the route deviation event occurrence time.

If the execution of another second function (for example, a communication function or a communication relay function, a texting function, a scheduling function, an alarm function, etc.) is requested at a time the route deviation event has occurred while the navigation function is being supplied via the vehicle interface, the control unit 180 may delay the operation of the second function until the route deviation event is ended or a predetermined time has passed.

As the first function, the navigation function is provided, and if the important event includes a cross entering event of the navigation function operation, the time period corresponding to the important event may include a time which has passed a predetermined time from the occurrence of the cross entering event of the navigation function.

If the execution of another second function (for example, a communication function or a communication relay function, a texting function, a scheduling function, an alarm function, etc.) is requested at the time the cross crossing event has occurred while the navigation function is being provided via the vehicle interface, the control unit 180 may delay the operation of the second function until a time the cross entering event is ended or a predetermined time has passed. Moreover, the delay of the operation of the second function may be continuously maintained during the time period until the ending time from the cross entering event occurrence.

The control unit 180 may determine any change in the acceleration of the vehicle sensed by the sensing unit 140 while the first function related with the vehicle interface is being provided. If the acceleration of the vehicle is over a threshold value, the occurrence of the important event may be determined.

For example, the first function may include a black box function to control the photographing function, etc. of the terminal 100 or the vehicle display device 200. If the important event has occurred due to the change in the acceleration, the operation of the second function may be delayed for a predetermined time.

Moreover, if the important event is ended, the communication function or the communication relay function, the texting function, the scheduling function or the alarm function, etc. may be resumed.

If the operation of the second function is stopped, the terminal 100 may execute another additional function to compensate for the execution delay of the second function without interrupting the provision of the vehicle interface. For example, if the operation of the communication function or the communication relay function is stopped, a guide information corresponding to the important event may be transmitted to a target terminal of the communication function or the communication relay function.

In order to process the additional function, the additional function processing unit 187 may execute an additional function to compensate for the delay of the second function. Moreover, if the execution delay of the second function is ended, the additional function processing unit 187 may resume the second function in accordance with an operation of the additional function.

More specifically, the first function may include a navigation function to perform the road guidance to a predetermined destination of the vehicle, and if the second function includes a communication function or a communication relay function with an opponent's terminal, the additional function may include a callback function, etc. if the guide message is transmitted to the opponent's terminal and the execution delay is ended.

The additional function processing unit 187 may perform at least one function to compensate for the delay of the second function.

For example, the additional function processing unit 187 may determine if the opponent's terminal is a previously designated exceptional terminal, and if it is the exceptional terminal, the execution of the second function may be allowed irrespective of the execution delay. For this, an identification information (a telephone number, a name, a company name, an IP address, etc.) of the previously set exceptional terminal may be stored in the additional function processing unit 187.

Moreover, if the execution delay of the second function is ended, the additional function processing unit 187 may divide a part of the screen provided via the vehicle interface into a region for the output of the second function, thus outputting the second function on a part of the vehicle interface.

Meanwhile, the power supply unit 190 may receive an external electric power and an internal electric power in accordance with a control of the control unit 180 and supply electric power which is necessary for the operation of each component. The power supply unit 190 may receive a wireless electric power via a holding device. The power supply unit 190 may be connected with a battery of the vehicle via the vehicle system connection unit 170 and may receive an operational electric power or a charging electric power from the vehicle.

Figure 3:
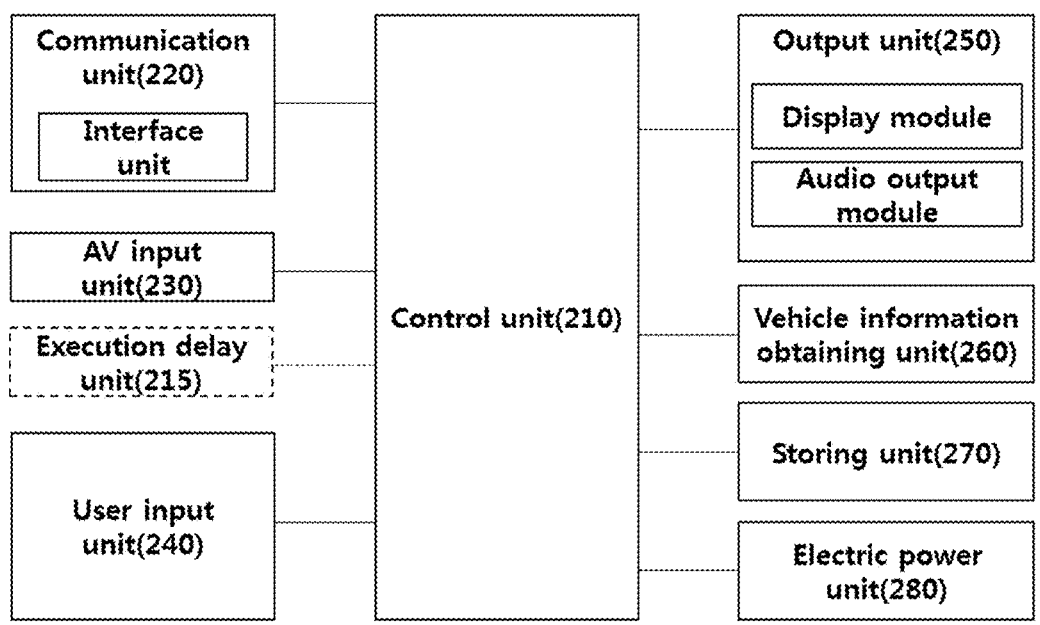
FIG. 3 is a block diagram illustrating a specific configuration of a vehicle display device according to an embodiment of the present invention.

FIG. 3 is a block diagram illustrating a detailed configuration of the vehicle display device according to an embodiment of the present invention.

The configuration of the vehicle display device 200 will be described with reference to FIG. 3.

The vehicle display device 200 may include, but is not limited to, a control unit 210, a communication unit 220, an AV input unit 230, a user input unit 240, an output unit 250, a vehicle information obtaining unit 260, a storing unit 270, and an electric power unit 280. An execution delay unit 215 may be selectively included.

The communication unit 220 of the vehicle display device 200 may include one or more module to allow a wireless communication between the vehicle display device 200 and the wireless communication system or between the vehicle display device 200 and the network where the terminal 100 positions. It may include an interface unit which allows a communication with the terminal 100 or the vehicle.

Moreover, the communication unit 220 may be connected with the terminal 100 via a wireless internet module or a short range communication module. The communication unit 220 may receive a vehicle interface data which is received wired or wirelessly from the terminal 100.

The communication unit 220, meanwhile, is able to obtain the position of the vehicle with the aid of the position information module. As a representative example, there is a GPS module.

In particular, if the vehicle display device 200 is driven with the navigation device thereof, the vehicle display device 200 may compute the current position of the vehicle based on the position data received from the satellite via the GPS module and may show the current position of the vehicle or may output a video data and an audio data corresponding to the map screen which shows the route to the destination.

The AV input unit 230 is employed for the sake of an audio signal or video signal input and may receive an AV input related with the vehicle interface from the terminal 100. It may include a camera (not illustrated) and a microphone (not illustrated). The camera is able to process a video frame, for example, a still image or a video obtained from the image sensor in the photographing mode, thus obtaining at least one image of at least one of the left side and the right side of the vehicle.

The video frame processed by the camera may be stored in the memory 130 or may be externally transmitted via a wireless communication unit. Two or more than two cameras may be provided depending on the use environment. The microphone may receive an external audio signal with the aid of a microphone function in a communication mode, a recording mode or a voice recognition mode and may be processed into an electrical voice data.

The user input unit 240 may generate an input data with which the user is able to control the operation of the vehicle display device 200. The user input unit may be formed of a key pad dome switch, a touch pad (a constant pressure/electrostatic type), a jog wheel, a jog switch, etc.

The output unit 250 is provided to generate an output related with a light sense, a hearing sense, a haptic sense, etc., and as illustrated in FIG. 3, it may include a display module and an audio output module.

The output unit 250 is configured to display (output) the information received at the display module via the terminal 100 or the information processed by the vehicle display device 200. For example, if the vehicle display device 200 provides a navigation function via the vehicle interface, it may display the UI (User Interface) or GUI (Graphic User Interface) related therewith.

Moreover, in an embodiment of the present invention, the display module of the output unit 250 may display a vehicle interface received from the terminal 100. The display unit module may include at least one among a LCD (Liquid Crystal Display), a TFT LCD (This Film Transistor Liquid Crystal Display), an OLED (Organic Light Emitting Diode), a flexible display, and a 3D display. It may be implemented in the form of a HUD (Head Up Display).

The audio output module of the output unit 250 may output a navigation voice provided via the vehicle interface or an audio data stored in the storing unit 270. The audio output module 250 may include a receiver, a speaker, a buzzer, etc.

The control unit 210 is able to control the whole operations of the vehicle display device 200.

In particular, the control unit 210 may provide a vehicle interface via the output unit 250 and may provide an operational screen based on the provisions of a first function related with the vehicle interface based on the information received from the terminal 100, the delayed second function and the additional function.

For this, the control unit 210 may selectively include an execution delay unit 215. The execution delay unit 215 is configured to transfer to the terminal 100 the vehicle information for an execution delay based on the vehicle information obtained from the vehicle information obtaining unit 260 or provide a result of the determination on the execution delay to the control unit 210. The delay of the second function may be implemented based on the vehicle interface provided from the control unit 210, which could be controlled by the terminal 100 and may operate in the display device 200 itself, and it may be applied if a control signal is received from the terminal 100 so as to control the vehicle interface.

Meanwhile, the vehicle information obtaining unit 260 may obtain a vehicle information to provide a vehicle information. The vehicle information obtaining unit 260 may include a vehicle movement sensing module and a driving information detection unit. The vehicle information obtaining unit 260 may transfer the obtained vehicle information to the control unit 210. The vehicle information, for example, may include a vehicle movement information and a driving information.

The vehicle movement sensing module is able to sense the vehicle movement information. The vehicle movement sensing module is able to generate a sensing signal by detecting the movement of the vehicle display device 200 based on the position, direction, acceleration or deceleration of the vehicle display device 200 of the vehicle display device 200. The driving information detection unit may be connected with an ECU (Electronic Control Unit) which is a cooperating control system of the vehicle, thus detecting the driving information from the vehicle. The driving information may include at least one among a speed, a time, a temperature, a mileage, a fuel amount, and an engine oil lifespan.

Meanwhile, the storing unit 270 may store a variety of information to provide a vehicle interface. For example, the storing unit 270 is able to temporarily store an AV data corresponding to the vehicle interface received from the terminal 100. Moreover, the storing unit 270 is able to store the vehicle movement information and driving information obtained by the vehicle information obtaining unit 260.

The electric power unit 280 is able to supply electric power for the sake of the whole operations of the vehicle display device 200. The vehicle display device 200 is connected with a batter of the vehicle, thus receiving an operational electric power.

Meanwhile, a communication between the components inside of the vehicle display device 200 or a communication between the vehicle display device 200 and an external module may be implemented using a CAN (Controller Area Network) communication method. The CAN communication may be referred to a standard communication protocol designed for the communication between a microcontroller and a device without using a host computer in the vehicle.

Figure 4:
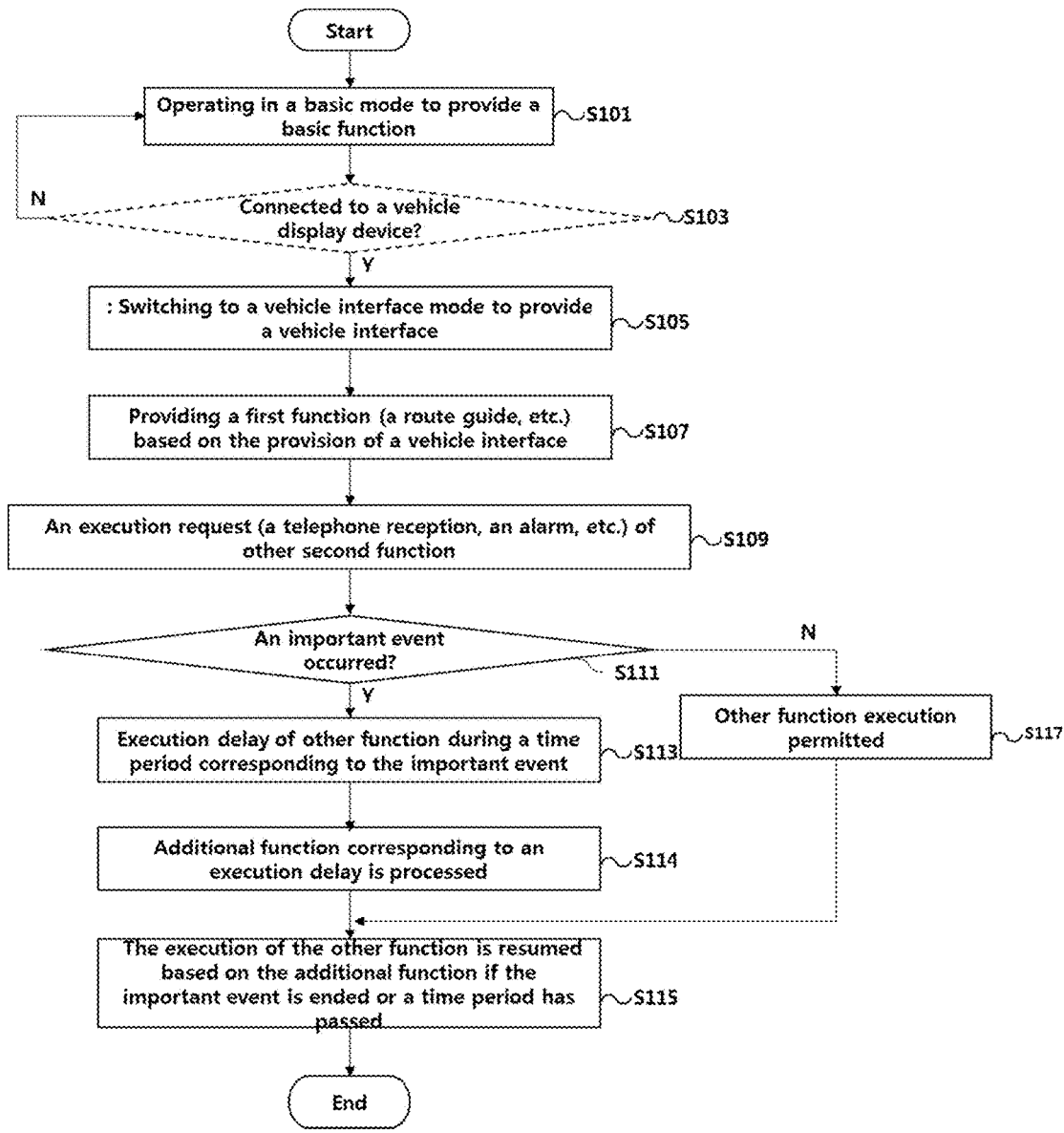
FIG. 4 is a flow chart for describing an operation of a terminal according to an embodiment of the present invention.

FIG. 4 is a flow chart for describing the operation of a terminal according to an embodiment of the present invention.

Referring to FIG. 4, the terminal 100 is configured to operate in the first mode wherein the basic functions are provided (S101).

The output unit 150 may output a first interface which is able to control the basic functions of the terminal via the display unit 151, and may provide a variety of functions, for example, a communication function or a communication relay function, a texting function, an internet function, a scheduling function, an alarm function, etc. which are basic functions implemented via the first interface.

It is detected that the terminal 100 has been connected with the vehicle display device 200.

The sensing unit 140 is able to detect a connection with the vehicle display device 200 by detecting the connection between the vehicle display device 200 and the vehicle system connection unit 170. Moreover, the terminal 100 may be connected with the vehicle display device 200 via the wireless communication unit 110. In this case, the terminal 100 may perform an authorization with respect to the vehicle display device 200. The connection with the vehicle display device 200 may be detected only if authorized.

If the terminal 100 is connected with the vehicle display device 200, the terminal 100 may switch to the vehicle interface mode which provides the vehicle interface (S105).

The terminal 100 may provide a first function based on the provision of the vehicle interface (S107).

For example, the control unit 180 may provide a route guide, etc. based on the navigation execution in the vehicle interface mode.

If an execution request of the second function which is different from the first function occurs (S109), the terminal 100 may determine if an important event has occurred (S111).

The occurrence of the important event may be determined by the event determination unit 185a based on at least one among the state information of the previously set vehicle interface, the sensing information sensed by the sensing unit 140 and the vehicle information received from the vehicle display device 200.

Thereafter, if the occurrence of the important event is confirmed, the terminal 100 may delay the execution of the different second function during a time period corresponding to the important event with the aid of the execution delay unit 185 (S113).

Moreover, the terminal 100 may process an additional function corresponding to the execution delay via the additional function processing unit 187 (S114).

The additional function processing unit 187 may execute an additional function to compensate for the delay of the second function.

Furthermore, if the delay condition is removed as the time period passes by or the occurrence of the important event is removed via the execution delay unit 185, the terminal 100 may resume the execution of the second function based on the additional function (S115).

If the execution delay of the second function is ended, the additional function processing unit 187 may resume the second function based on the operation of the additional function. For example, the additional function processing unit 187 may divide the vehicle interface screen, thus displaying a region to provide the provision of the second function.

Meanwhile, if the important event has not occurred, the terminal 100 may confirm that the execution of the second function via the execution delay unit 185 has been allowed, and may execute the second function via the control unit 180 (S117).

Figure 5:
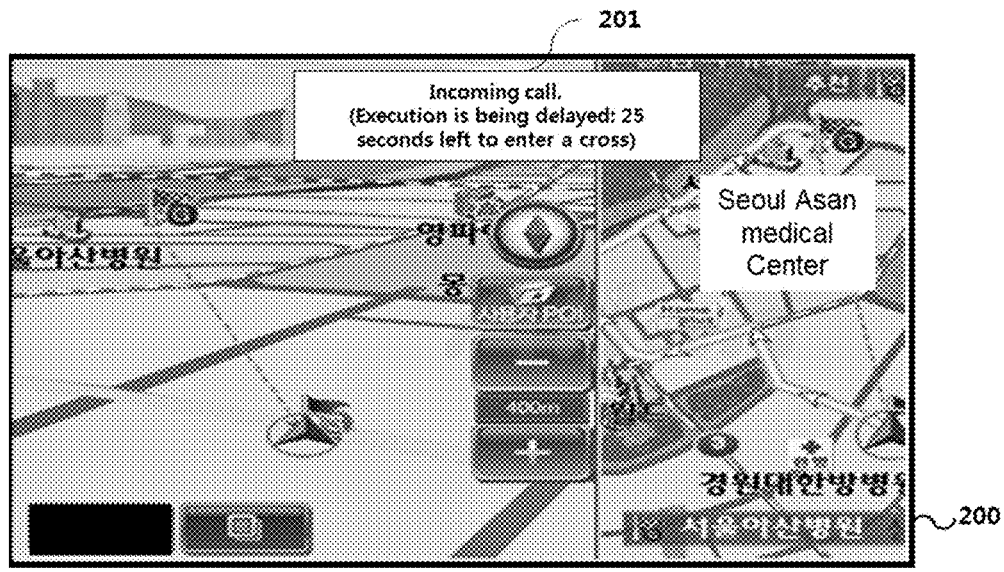
FIGS. 5 and 6 are views illustrating vehicle interface changes which are outputted based on the operation of a terminal according to an embodiment of the present invention.
Figure 6:
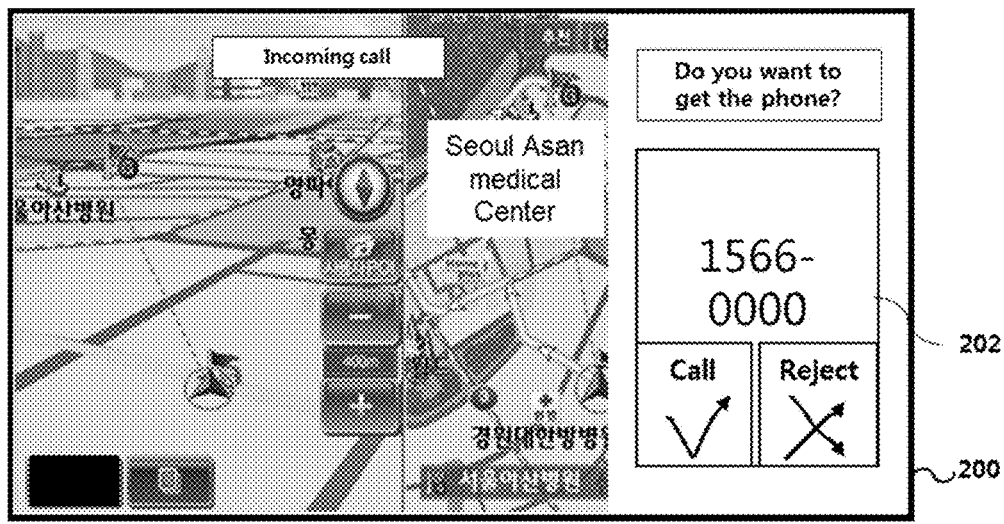

FIGS. 5 and 6 are views illustrating a vehicle interface change outputted based on the operation of the terminal according to an embodiment of the present invention.

As illustrated in FIG. 5, the vehicle interface generated by the terminal 100 may be outputted via the vehicle display device 200, which is provided, for example, for the purpose of illustrations. The vehicle interface may be outputted via the output unit 150 of the terminal 100.

In the vehicle interface mode, the request of the second function, for example a telephone reception, etc. may occur at the terminal 100. The terminal 100 is able to delay for a delay time the execution request of the operation of the second function while maintaining the provision of the first function of the vehicle interface. Moreover, the delay guide message 201 may be displayed on the vehicle interface. The delay guide message 201 may include at least one information among the information of the second function, a delay condition, and a remaining time, thus providing the information that the user wants.

As illustrated in FIG. 6, if the delay time passes by or the important event is removed, the operation of the second function may be resumed. Referring to FIG. 6, the telephone reception screen 202 corresponding to the second function may be displayed through the vehicle interface, and the communication function or the communication relay function corresponding to the second function may be executed.

Figure 7:
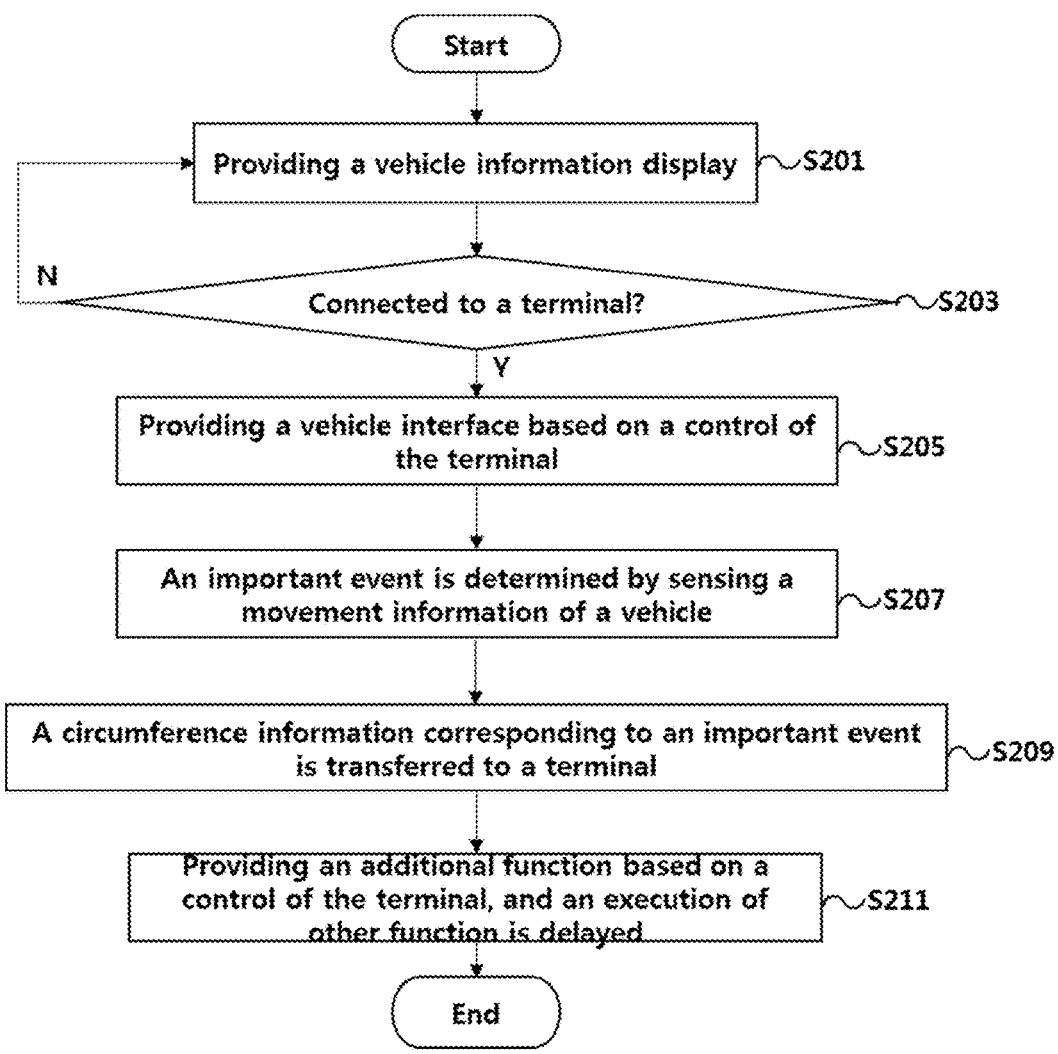
FIG. 7 is a flow chart for describing an operation of a vehicle display device according to another embodiment of the present invention.

FIG. 7 is a flow chart for describing the operation of the vehicle display device according to another embodiment of the present invention.

As described above, the vehicle display device 200 may receive a vehicle interface generated by the terminal 100 and output only a video and audio signal through the output unit 250. In this case, the terminal 100 may generate a control signal to control the vehicle interface, thus controlling the vehicle interface, and the vehicle display device 200 may output a result of the control.

Moreover, according to another embodiment of the present invention, the vehicle display device 200 may provide a vehicle interface generated by the vehicle display device 200, and if the terminal 100 is connected, it may receive a control signal generated by the terminal 100, thus performing a vehicle interface control of the vehicle display device 200.

Referring to FIG. 7, the vehicle display device 200 according to another embodiment of the present invention may first provide a vehicle information display (S201).

The control unit 210 may receive or generate a vehicle information display data and provide via the output unit 250.

If a connection with the terminal 100 is detected (S203), the vehicle display device 200 may provide a vehicle interface in response to a control of the terminal 100 (S205).

The control unit 210 may confirm through an authorization with the terminal 100 if the terminal is a terminal having an authorization to control the vehicle interface. If authorized, the control unit 210 may provide a control authorization with respect to the vehicle interface.

Moreover, the vehicle display device 200 may provide a movement information of the vehicle to the terminal 100, and the vehicle obtaining unit 260 may obtain a vehicle information including the movement information of the vehicle.

Thereafter, the vehicle display device 200 may determine an important event by sensing the movement information of the vehicle based on the vehicle information (S207) and may generate a circumference information corresponding to the important event in accordance with a control of the control unit 210 and may transfer to the terminal 100 (S209).

Moreover, the vehicle display device 200 may delay the execution of another function while controlling the vehicle interface in accordance with a control signal received from the terminal 100, and may process the provision of the additional function (S211).

Figure 8:
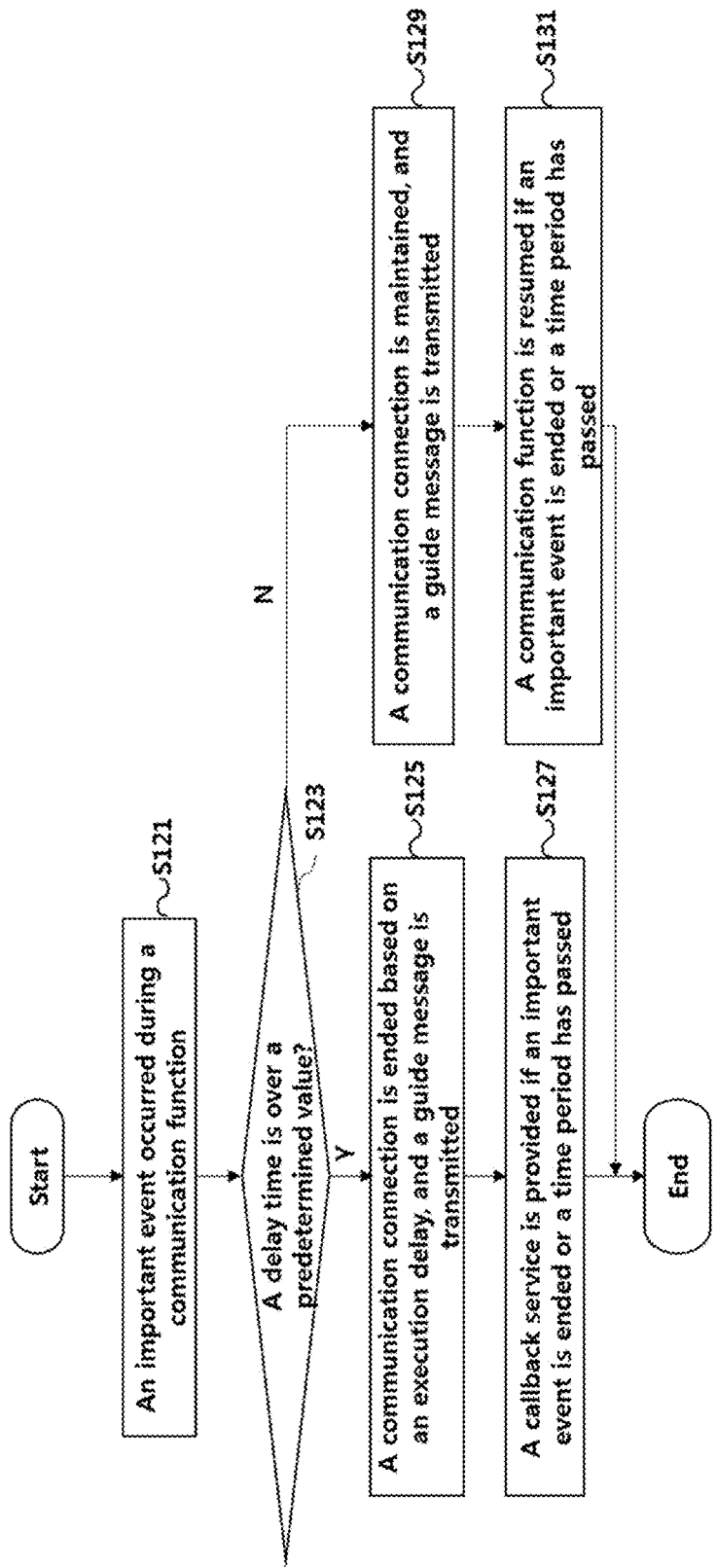
FIG. 8 is a flow chart for describing an additional function providing operation of a terminal according to an embodiment of the present invention.
Figure 9:
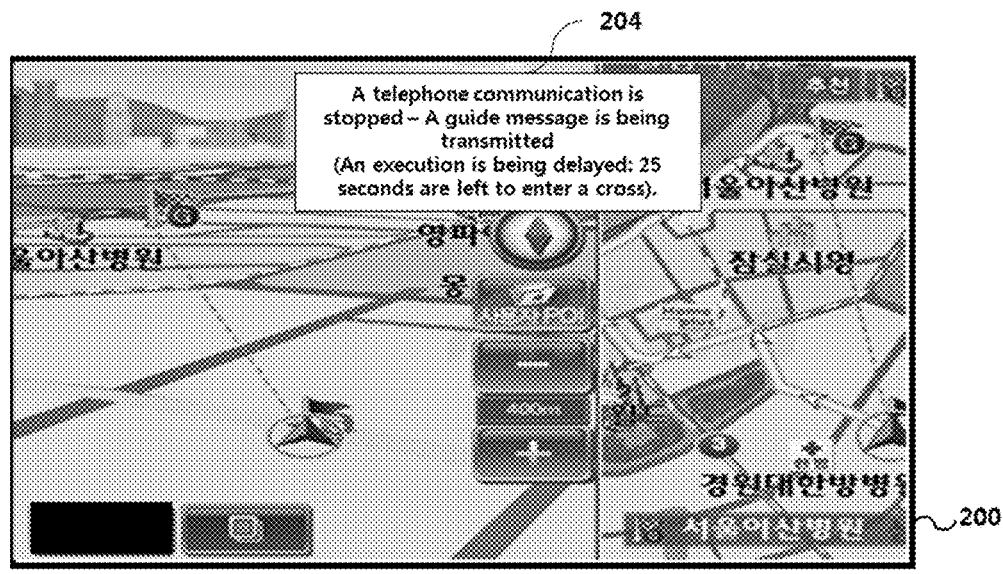
FIGS. 9 to 11 are views illustrating a vehicle interface change.
Figure 10:
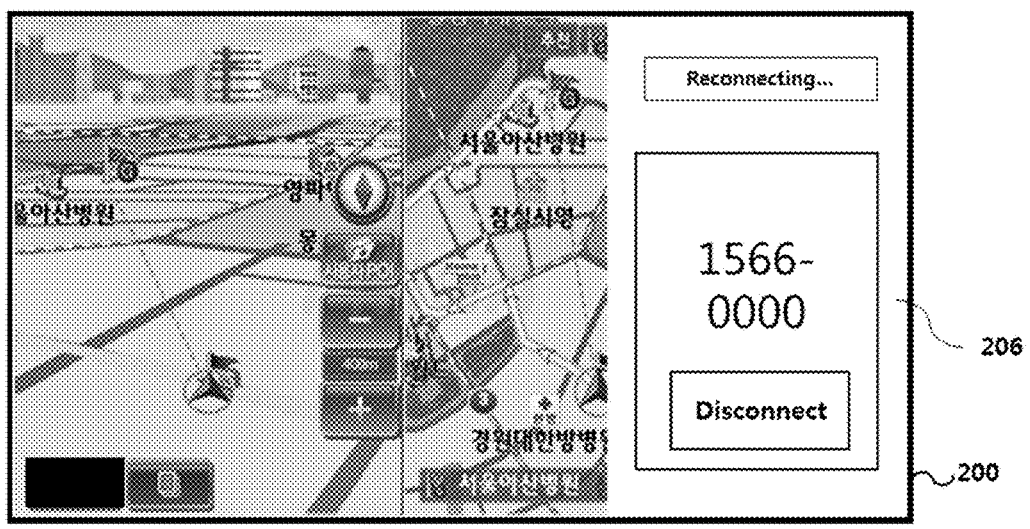
Figure 11:
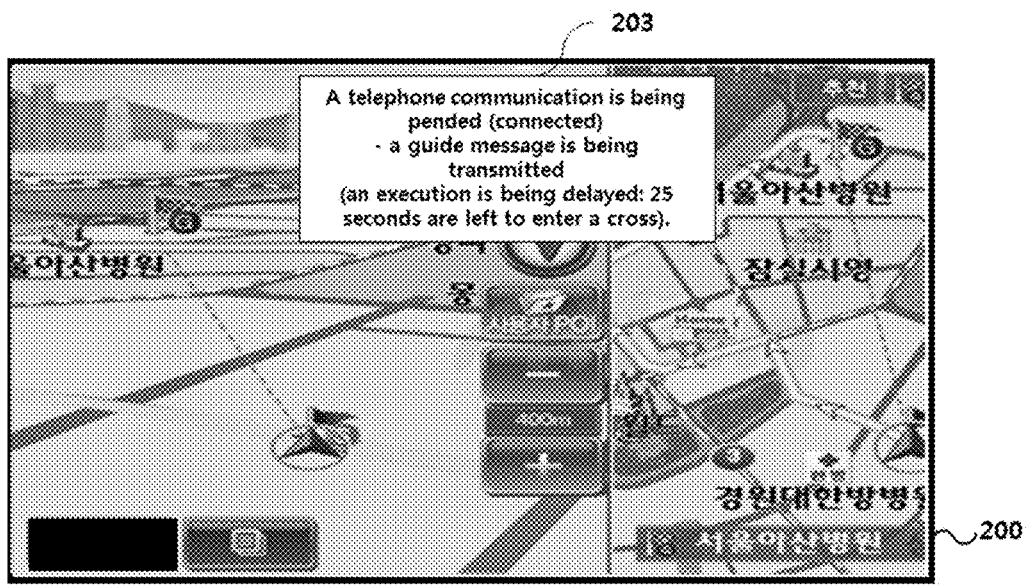

FIG. 8 is a flow chart for describing an additional function providing operation of a terminal according to an embodiment of the present invention, and FIGS. 9 to 11 are views illustrating a vehicle interface change.

FIGS. 8 to 11 show an embodiment wherein if an important event related with the vehicle interface of the terminal 100, the communication function or the communication relay function are delayed. In this case, the first function may correspond to the navigation function, etc. to perform a road guidance to a predetermined destination of the vehicle, and the second function may include a communication function with the opponent's terminal or the communication relay function.

If an important event among the communication function and the communication relay function occurs (S121), the terminal 100 may determine through the additional function processing unit 187 if the delay time is over a predetermined value (S123).

If the delay time corresponding to the execution delay is over a predetermined time, the terminal 100 may end a communication connection with the opponent's terminal through the additional function processing unit 187, and if the communication connection is ended, the terminal 100 may transmit a guide message corresponding to the execution delay to the opponent's terminal (S125). Here, the guide message may include at least one among the voice message and the text message.

FIG. 9 shows a vehicle interface when the communication connection is ended. Referring to FIG. 9, a guide information on the telephone communication stop and an information on the guide message transmission can be outputted to the vehicle interface.

Moreover, if the important event is ended or the time period due to the delay time passes by, the terminal 100 may provide, through the additional function processing unit 187, a callback service for the execution of the communication function or the communication relay function (S217).

As illustrated in FIG. 10, the callback service may include a service to transmit a call signal in order to resume a communication connection to the opponent's terminal. Moreover, in order to provide a region 206 for the callback service, the additional function processing unit 187 may output to a part of the screen of the interface or may process the screen division.

Meanwhile, if the delay time corresponding to the execution delay is below a predetermined time, the terminal 100 may transmit, through the additional function processing unit 187, a guide message corresponding to the execution delay to the opponent's terminal while maintaining a communication connection with the opponent's terminal (S129).

The guide message may include at least one among the voice message and the text message, and the voice message may be transmitted through the communication connection. The execution delay unit 185 may interrupt and delay a part of the second function. The execution delay unit 185 may interrupt only the input and output functions of the voice while maintaining the communication connection due to the execution delay. FIG. 11 shows the vehicle interface screen, and an information on the maintained communication connection can be displayed together.

If the important event is ended or the time period due to the delay time passes by, the terminal 100 may resume the communication function or the communication relay function through the additional function processing unit 187 (S131).

The methods according to the various embodiments of the present invention may be provided to each server or device in a state where it is implemented in the form of a program code and is stored in a non-transitory computer readable medium.

The non-transitory computer readable medium represents a medium which is able to semi-permanently store data and is readable by a predetermined device, not a medium, for example, a register, a cache, a memory, etc. which is able to temporarily store data. More specifically, the aforementioned various applications or programs may be stored and provided in a non-transitory computer readable medium, for example, a CD, a DVD, a hard disk, a blue ray disk, a USB, a memory card, a ROM, etc.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for controlling a vehicle terminal including computer processors providing a vehicle interface, the method comprising:
providing a first function related with the vehicle interface;
delaying an execution time of a second function under a predetermined condition, if an execution of the second function which is different from the first function of the terminal is requested during a time period corresponding to a predetermined event which occurs during the providing of the first function;
executing a predetermined additional function to compensate for the execution time delay of the second function when the execution of the second function has been delayed; and
resuming the second function based on operation results of the additional function when the execution time delay of the second function is ended, wherein the delaying comprises:
previously storing in a memory of the terminal, a mapping table including state information, the predetermined event corresponding to the state information, and a delay time period corresponding to the predetermined event,
wherein the state information is determined by at least one of attribute values of processes executed by a control unit of the terminal, vehicle interface control information processed by the control unit, and sensing information of a sensing unit of the terminal; and
determining a delay condition and a delay time for the second function using the mapping table so that the execution time delay of the second function is determined by the predetermined event.

2. The method of claim 1, wherein the first function includes a navigation function to perform a road guidance to a predetermined destination of the vehicle, and the second function includes a call function or a call relay function with a calling opponent's terminal.

3. The method of claim 2, wherein the additional function includes a callback function to the calling opponent's terminal.

4. The method of claim 2, wherein the executing the additional function comprises:
ending a communication connection to the calling opponent's terminal, if the delay time period corresponding to the execution time delay is over a predetermined time; and
transmitting a guide message corresponding to the execution time delay to the calling opponent's terminal, if the communication connection is ended.

5. The method of claim 2, wherein the executing the additional function comprises transmitting a guide message corresponding to the execution time delay to the calling opponent's terminal while maintaining a communication connection to the calling opponent's terminal, if the delay time period corresponding to the execution time delay is below a predetermined time.

6. The method of claim 4, wherein the guide message includes a voice or text message.

7. The method of claim 2, wherein the executing the additional function comprises:
determining if the calling opponent's terminal is a previously designated terminal; and
permitting the execution of the second function irrespective of the execution time delay, if the calling opponent's terminal is determined as the previously designated terminal.

8. The method of claim 1, wherein the executing the additional function comprises dividing a part of a display screen provided through the vehicle interface into a region to output the second function.

9. A vehicle terminal including computer processors for providing a vehicle interface, the vehicle terminal comprising:
a vehicle interface generation unit generating the vehicle interface which provides, through a GUI (Graphic User Interface), an information related with a vehicle;
a control unit providing a first function through the vehicle interface;
an execution delay unit delaying an execution time of a second function under a predetermined condition, if an execution of the second function which is different from a first function of the terminal, is requested during a time period corresponding to a predetermined event which occurs during the providing of the first function; and
an additional function processing unit executing an additional function to compensate for the execution time delay of the second function, when the execution of the second function is delayed,
wherein if the execution delay of the second function is ended, the control unit resumes the second function based on operation results of the additional function,
wherein the delay unit previously stores in a memory of the terminal, a mapping table including state information, a predetermined event corresponding to the state information, and a delay time period corresponding to the predetermined event,
wherein the state information is determined by at least one of attribute values of processes executed by a control unit of the terminal, vehicle interface control information processed by the control unit, and sensing information of a sensing unit of the terminal; and
wherein the execution delay unit determines a delay condition and a delay time for the second function using the mapping table so that the execution time delay of the second function is corresponding to the predetermined event.

10. A method for controlling of a vehicle terminal including computer processors providing a vehicle interface, comprising:
providing a first function through the vehicle interface; and
delaying an execution time of a second function, if a predetermined event corresponding to the first function during the provision of the first function occurs, and the execution of the second function which is different from the first function of the terminal, is requested during a time period corresponding to the predetermined event,
wherein the delaying comprising:
previously storing in a memory of the terminal, a mapping table including state information, a predetermined event corresponding to the state information and a delay time period corresponding to the predetermined event,
wherein the state information is determined by at least one of attribute values of processes executed by a control unit of the terminal, vehicle interface control information processed by the control unit, and sensing information of a sensing unit of the terminal; and
determining a delay condition and a delay time for the second function using the mapping table so that the execution time delay of the second function is determined by the predetermined event.

11. The method of claim 10, wherein the first function includes a navigation function to perform a road guidance to a predetermined destination of the vehicle.

12. The method of claim 11, wherein the predetermined event includes a guide announcement output event of the navigation function, and the time period corresponding to the predetermined event corresponds to an output time of the guide announcement.

13. The method of claim 11, wherein the predetermined event includes a route deviation event of the navigation function, and the time period corresponding to the predetermined event includes a time which has passed a predetermined time from the occurrence time of the route deviation event.

14. The method of claim 11, wherein the predetermined event includes a cross entering event of the navigation function, and the time period corresponding to the predetermined event includes a time period until an ending time from the occurrence time of the cross entering event.

15. The method of claim 10, wherein the delaying includes stopping the operation of the second function, if the predetermined event has occurred in a state where the first function and the second function are concurrently being provided.

16. The method of claim 15, wherein the first function corresponds to the navigation function, and the second function corresponds to a communication function or a communication relay function, and the predetermined event corresponds to a guide announcement output event of the navigation function, wherein the method further includes resuming the communication function or the communication relay function if the guide announcement output event is ended.

* * * * *